United States Patent
Nagasaka et al.

(10) Patent No.: US 8,350,806 B2
(45) Date of Patent: Jan. 8, 2013

(54) FORCE/TACTILE DISPLAY, METHOD FOR CONTROLLING FORCE/TACTILE DISPLAY, AND COMPUTER PROGRAM

(75) Inventors: Kenichiro Nagasaka, Tokyo (JP); Masakuni Nagano, Tokyo (JP); Keisuke Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 880 days.

(21) Appl. No.: 12/072,225

(22) Filed: Feb. 25, 2008

(65) Prior Publication Data
US 2008/0204425 A1    Aug. 28, 2008

(30) Foreign Application Priority Data

Feb. 27, 2007 (JP) ................................ 2007-046580

(51) Int. Cl.
*G09G 5/00* (2006.01)
(52) U.S. Cl. ........................................ 345/156; 600/595
(58) Field of Classification Search .................. 345/156
See application file for complete search history.

(56) References Cited

U.S. PATENT DOCUMENTS 6,042,555 A * 3/2000 Kramer et al. ................ 600/595
2006/0122819 A1 * 6/2006 Carmel et al. .................. 703/21

FOREIGN PATENT DOCUMENTS

| JP | A 08-069449 | 3/1996 |
| JP | 3329443 | 7/2002 |
| JP | 3624374 | 12/2004 |

OTHER PUBLICATIONS

Haruhisa Kawasaki et al., "Multi-Fingered Haptic Interface Opposed to Human Hand", vol. 23, No. 4, pp. 449-456, 2005.
JP 2007-046580; Japanese Office Action issued Jul. 5, 2011.

* cited by examiner

*Primary Examiner* — Kevin M Nguyen
*Assistant Examiner* — Cory Almeida
(74) *Attorney, Agent, or Firm* — Frommer Lawrence & Haug LLP; William S. Frommer; Ellen Marcie Emas

(57) ABSTRACT

A force/tactile display that presents force/tactile sensation that occurs in response to physical interaction with each of a plurality of objects present in a virtual environment includes an action point defined on the mechanical structure, the action point presenting the force/tactile sensation, an applied force control means for controlling the force exerted on the action point, and an action point control means for controlling the position of the action point.

15 Claims, 10 Drawing Sheets

FORCE/TACTILE DISPLAY, METHOD FOR CONTROLLING FORCE/TACTILE DISPLAY, AND COMPUTER PROGRAM

CROSS REFERENCES TO RELATED APPLICATIONS

The present invention contains subject matter related to Japanese Patent Application JP 2007-046580 filed in the Japanese Patent Office on Feb. 27, 2007, the entire contents of which being incorporated herein by reference.

BACKGROUND OF THE INVENTION

1. Field of the Invention

The present invention relates to a force/tactile display for receiving force/tactile presentation from a virtual environment, a method for controlling the force/tactile display, and a computer program, particularly to a force/tactile display that presents grasp sensation to a plurality of fingertips, a method for controlling the force/tactile display, and a computer program.

More specifically, the invention relates to a grasp-type force/tactile display that presents each of a plurality of fingertips with the action point indicating which portion of the fingertip is in contact, a method for controlling the force/tactile display, and a computer program, particularly to a force/tactile display that smoothly presents the action point in response to discontinuous collision events between a fingertip and an object, a method for controlling the force/tactile display, and a computer program.

2. Description of the Related Art

In the technical fields of virtual reality and tele-reality, a force/tactile display or a "haptic device" may be essential to present an operator with not only visual and auditory information but also force and tactile sensation.

Recent improvements in computing speed and advances in simulation technology have allowed real-time simulation of a virtual environment in which a plurality of objects are present at the same time and physical interaction, such as collision and contact, occurs among the objects. An ability to calculate collision between objects and the contact force generated there between in an accurate, real-time manner taking dynamics into consideration allows a user to be presented with realistic sensation when the user touches or grasps an object in the virtual environment through a haptic device by using a motor to actually produce the calculated force.

Haptic devices have found a wide variety of applications. Three-dimensional force sensation and tactile sensation of an object in an actually inaccessible environment can be presented, for example, in mastering medical and other special skills, and in remote manipulation in a virtual environment, such as a microcosm and the ocean, and in a special or hazardous environment, such as an atomic reactor. As the scale and accuracy of a virtual space that can be processed in a real-time manner increase, the demand for a force/tactile display is expected to increase in the future.

A typical example of the haptic device is of stylus type using a serial link shown in FIG. 10. A user grasps the front-end portion of the stylus, where moments of force around three to six axes are presented (see http://www.sensable.com/haptic-phantom-desktop.htm (as of Feb. 3, 2007), for example).

As a structure that solves insufficient rigidity of a serial link, there has also been proposed a haptic device using a parallel link structure to present moments of force around three to six axes as shown in FIG. 11 (see Japanese Patent No. 3329443, http://forcedimension.com/fd/avs/home/products/ (as of Feb. 3, 2007), and http://www.quanser.com/industrial/.html/products/fs_5dof.as p (as of Feb. 3, 2007), for example).

Any of the haptic devices using these link mechanisms presents force/tactile sensation at only one point in the grasp position. In other words, such a haptic device is not designed to present force/tactile sensation to each of the fingers of the operator independent of each other. Therefore, such a device cannot present the sensation when the fingers grasp a virtual object.

On the other hand, a multi-fingered haptic device has a function of using a master hand that remotely operates a slave hand, such as a robot hand, to convey the motion of the master hand (operation means) to the slave hand (manipulation means) and presenting force sensation of the slave hand to the master hand. That is, the operator on the master side can feel as if he/she were directly acting on the object being manipulated.

To present force to multiple fingers, there has been proposed a haptic device in which a finger is connected to remote motors with wires through which forces are applied as shown in FIG. 12 (see http://sklab-www.pi.titech.ac.jp/frame_index-j.html (as of Feb. 3, 2007), for example). In such a device configuration, however, it is necessary to typically control the wires in such a way that they will not be loose, so that the control tends to be complicated. Further, the wires likely interfere with one another, so that the range of motion, particularly rotation, is not very large.

There has also been proposed a haptic device in which a hand-type force presentation mechanism is added to a manipulator opposed to a human hand as shown in FIG. 13 (see Haruhisa Kawasaki, Takumi Hori, and Tetsuya Mouri, "Multi-fingered haptic interface opposed to a human hand" (the Robotics Society of Japan, Vol. 23, No. 4, pp. 449-456, 2005), for example). There has been proposed a method similar to this method, in which a hand-type force presentation mechanism is added to the tip of an exoskeleton (see http://www.immersion.com/3d/products/cyber_grasp.php (as of Feb. 4, 2007), for example). There has also been proposed a system in which a finger stall is attached to the tip of the serial link described above and three-axis forces are presented to the finger (see Japanese Patent No. 3624374, for example).

Any of the haptic devices of the related art described above can present only a translational force to a fingertip, but cannot present which portion of the fingertip is in contact, that is, the action point. It can therefore hardly be said that such a haptic device presents grasp sensation to a plurality of fingertips in a satisfactory manner.

To present the contact position on a fingertip, it is conceivable to add a degree of freedom for force control for moment presentation to the force presentation device attached to the finger. Such a method, however, may typically require a motor having a relatively large output, so that the resultant mechanical structure is inappropriate for force presentation to multiple fingers because the weight of the entire structure increases and the force presentation devices attached to the fingers likely interfere with one another.

Further, position control of the action point causes a problem of delay of action point presentation in response to discontinuous collision events between a fingertip and an object.

SUMMARY OF THE INVENTION

It is desirable to provide an excellent force/tactile display that cansuitably present grasp sensation to a plurality of fingertips, a method for controlling the force/tactile display, and a computer program.

It is also desirable to provide an excellent force/tactile display that can present each of a plurality of fingertips with the action point indicating which portion of the fingertip is in contact, a method for controlling the force/tactile display, and a computer program.

It is also desirable to provide an excellent force/tactile display that can smoothly present the action point in response to discontinuous collision events between a fingertip and an object, a method for controlling the force/tactile display, and a computer program.

A first embodiment of the invention is a force/tactile display that presents force/tactile sensation that occurs in response to physical interaction with each of a plurality of objects present in a virtual environment, the force/tactile display including:

an action point defined on the mechanical structure, the action point presenting the force/tactile sensation;

an applied force control means for controlling the force exerted on the action point; and an action point control means for controlling the position of the action point.

In the technical fields of virtual reality and tele-reality, a haptic device may be essential to present an operator with not only visual and auditory information but also force and tactile sensation. For example, with a multi-fingered haptic device, the operator can feel as if he/she were directly acting on the object being manipulated. The multi-fingered haptic devices of the related art described above can present only a translational force to a fingertip, but cannot present which portion of the fingertip is in contact, that is, the action point. It can therefore hardly be said that such a haptic device presents grasp sensation to a plurality of fingertips in a satisfactory manner.

In contrast, the force/tactile display according to the embodiment of the invention, which presents grasp sensation to a plurality of fingertips, has a degree of freedom for position control added to the tip that abuts a fingertip. For example, when a serial link configuration is employed, each joint that connects adjacent links is driven under force control to present a translational force to a fingertip. On the other hand, the tip of the serial link is driven under position control to present the contact point to the fingertip.

To achieve a mechanism for presenting the contact point by using a degree of freedom for position control, a deceleration means can be combined because back-drivability is not critical, so that even a small motor can present the contact point in a satisfactory manner. As a result, the structure can be simplified and the weight thereof can be reduced.

When the position of the action point is controlled, there is a problem of time delay before the action point is presented in response to discontinuous collision events between a fingertip and an object. To solve this problem, the force/tactile display according to an embodiment of the invention is designed to predict a future collision point even when no contact has yet been made, and drive a fingertip position control system in advance in such a way that the predicted collision point coincides with the action point. Therefore, even when collision events discontinuously occur, the action point can be presented in a satisfactory manner without any time delay.

Specifically, the force/tactile display further includes a collision detection means for detecting collision between objects present in the virtual environment and outputs collision point information, a collision prediction means for predicting collision between objects present in the virtual environment and outputs predicted collision point information, and an action point determination means for determining the position of the action point as a control target value used in the action point control means based on the collision point information obtained by the collision detection means or the collision prediction means.

In the multi-fingered force/tactile display, objects present in the virtual environment include a finger model corresponding to a user's finger that abuts the action point. In this case, the collision detection means detects collision between the finger model and the other objects, and the collision prediction means predicts collision between the finger model and the other objects. The applied force control means controls the force to be presented to the user at the action point, and the action point control means controls the position of the action point that abuts the user's finger.

The action point determination means may determine to use the collision point information calculated by the collision detection means as the control target value used in the action point control means when the collision detection means has judged that there is collision with the finger model-type object, where as determining to use the collision point information calculated by the collision prediction means as the control target value used in the action point control means when the collision detection means has judged that there is no collision with the finger model-type object.

The force/tactile display further includes a finger position/attitude measurement means measuring the position and attitude of the user's finger that abuts the action point, and a dynamics computation means determining the position and attitude of each of the objects other than the finger model in the virtual environment based on dynamics computation. In this case, the collision detection means can detect collision between the finger model and each of the objects based on the position and attitude of the finger model based on the result of the measurement performed by the finger position/attitude measurement means and the position and attitude of each of the objects determined by the dynamics computation means. The collision prediction means can predict collision between the finger model and each of the objects based on the position and attitude of the finger model based on the result of the measurement performed by the finger position/attitude measurement means and the position and attitude of each of the objects determined by the dynamics computation means.

The force/tactile display may further include a collision force calculation means for calculating the external force acting on the collision point between the finger model and each of the objects detected by the collision detection means, and a fingertip applied force calculation means for calculating a fingertip applied force, which is the resultant force of the external forces, calculated by the collision force calculation means, that act on the finger model from each colliding object. In this case, the applied force control means can control the force exerted on the action point in such a way that the fingertip applied force calculated by the fingertip applied force calculation means is presented to the user's finger that abuts the action point.

The collision prediction means may determine nearest neighbor point pairs between the finger model and the other objects and predict the collision point to be one of the points of the nearest neighbor point pair with the smallest Euclidean distance among the nearest neighbor point pairs. Specifically, the GJK algorithm (Gilbert-Johnson-Keerthi distance algorithm) (which will be described later) can be used to determine the nearest neighbor point pairs between the finger model and the other objects.

A second embodiment of the invention is a computer program expressed in a computer readable form, the computer program causing a computer to carry out processes for controlling a force/tactile display that presents force/tactile sensation that occurs in response to physical interaction with each of a plurality of objects present in a virtual environment, the force/tactile display including an action point defined on the mechanical structure, the action point presenting the force/tactile sensation, an applied force control means for controlling the force exerted on the action point, and an action point control means for controlling the position of the action point, the computer program causing the computer to carry out:

the collision detection procedure that detects collision between objects present in the virtual environment and outputs collision point information;

the collision prediction procedure that predicts collision between objects present in the virtual environment and outputs predicted collision point information; and the action point determination procedure that determines the position of the action point as a control target value used in the action point control means based on the collision point information obtained in the collision detection procedure or the collision prediction procedure.

The computer program according to the second embodiment of the invention defines a computer program expressed in a computer readable form to carry out predetermined processes on a computer. In other words, by installing the computer program according to the second embodiment of the invention in a computer, a cooperative effect is provided on the computer, and by controlling the processes and actions of the force/tactile display, there is provided an advantageous effect similar to that provided in the force/tactile display according to the first embodiment of the invention.

According to the embodiments of the invention, there are provided an excellent force/tactile display that can suitably presents grasp sensation to a plurality of fingertips, a method for controlling the force/tactile display, and a computer program.

According to the embodiments of the invention, there are provided an excellent force/tactile display that can present each of a plurality of fingertips with the action point indicating which portion of the fingertip is in contact, a method for controlling the force/tactile display, and a computer program.

According to the embodiments of the invention, there are provided an excellent force/tactile display that can smoothly present the action point in response to discontinuous collision events between a fingertip and an object, a method for controlling the force/tactile display, and a computer program.

Since the force/tactile display according to the embodiments of the invention, which presents grasp sensation to a plurality of fingertips, has a degree of freedom for position control added to the tip that abuts a fingertip, the contact point can be presented to the fingertip. Further, by predicting a future collision point even when no contact has yet been made, and driving the fingertip position control system in advance in such a way that the predicted collision point coincides with the action point, even when collision events discontinuously occur, the action point can be presented in a satisfactory manner without any time delay, and more precise grasp sensation can be fed back to the fingertip of the user.

Other objects, features, and advantages of the invention will be apparent from the detailed description based on the following embodiments of the invention and accompanying drawings.

DESCRIPTION OF THE PREFERRED EMBODIMENTS

Embodiments of the invention will be described below in detail with reference to the drawings.

In the technical fields of virtual reality and tele-reality, a haptic device may be essential to present an operator with not only visual and auditory information but also force and tactile sensation. For example, a multi-fingered haptic device can provide the operator a feeling as if the operator were directly acting on the object being manipulated. Any of the multi-fingered haptic devices of the related art, however, can present only a translational force to a fingertip, but cannot present which portion of the fingertip is in contact, that is, the action point. It can therefore hardly be said that such a haptic device presents grasp sensation to a plurality of fingertips in a satisfactory manner.

Figure 1:
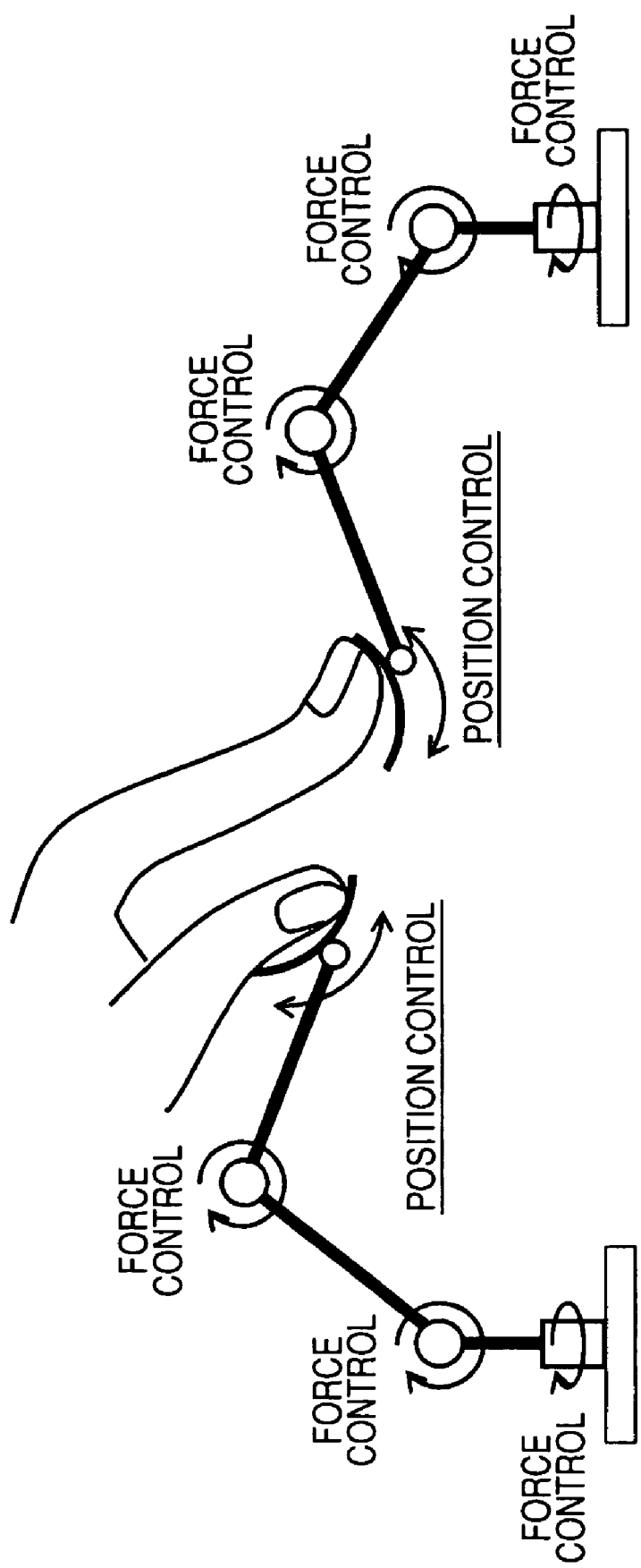
FIG. 1 schematically shows the configuration of a haptic device according to an embodiment of the invention.

To present the contact point on a fingertip, the inventors propose a haptic device in which a degree of freedom for position control is added to the tip that abuts a fingertip. FIG. 1 shows an exemplary configuration of a haptic device of this type. The illustrated device has a serial link configuration, and each joint that connects adjacent links corresponds to an articulation. Each joint is driven by an actuator, such as a DC servo motor, and the articulation angle is measured with an encoder. Each joint is driven under force control, and presents a translational force to a fingertip. On the other hand, the tip of the serial link is driven under position control, and can present the contact point to the fingertip. Not only by providing a translational force at the action point but also by controlling the position of the action point on the fingertip, more precise grasp sensation can be fed back to the user.

In the configuration of the haptic device shown in FIG. 1, back-drivability is not critical. A deceleration unit can therefore be combined, so that even a small motor can present the contact point in a satisfactory manner. As a result, the structure can be simplified and the weight thereof can be reduced.

Figure 2:
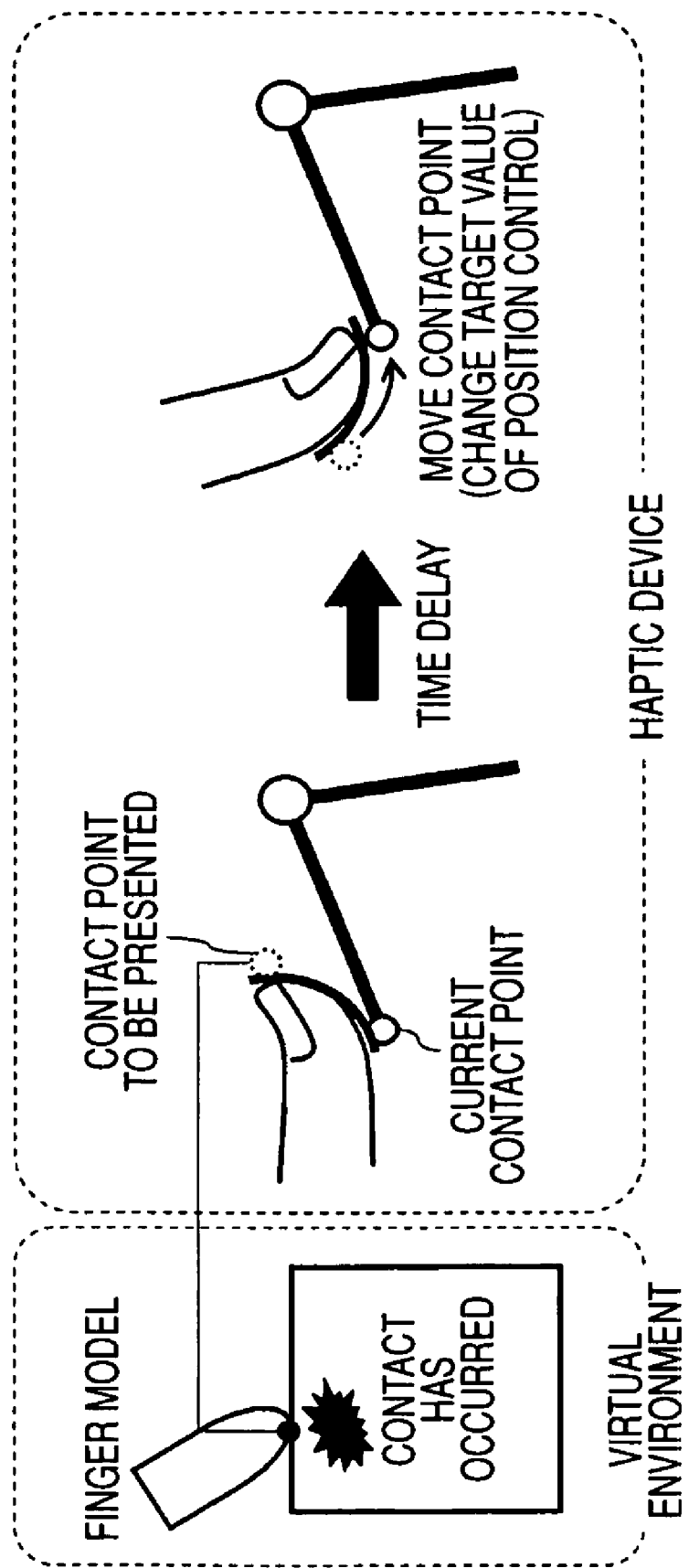
FIG. 2 explains the behavior of the haptic device when an event, such as contact and collision, abruptly occurs between a finger model and another object in a virtual environment.

On the other hand, as shown in FIG. 2, when an event, such as contact and collision, abruptly occurs between a finger model and another object in a virtual environment, it is necessary to change the current value of the position control-type actuator to the calculated collision point. There will therefore be a problem of time delay before the contact point is presented.

To solve the problem of the time delay before the contact point is presented, the haptic device according to an embodiment of the invention introduces a technology for predicting collision between objects in a virtual environment. Specifically, collision between a finger model and an object in the virtual environment is predicted in advance, and the current value of the position control-type actuator attached to the fingertip is changed to the predicted collision point in advance. In this way, even when contact or collision abruptly occurs between the finger model and the virtual object, the accurate contact point can be presented without any delay.

Figure 3:
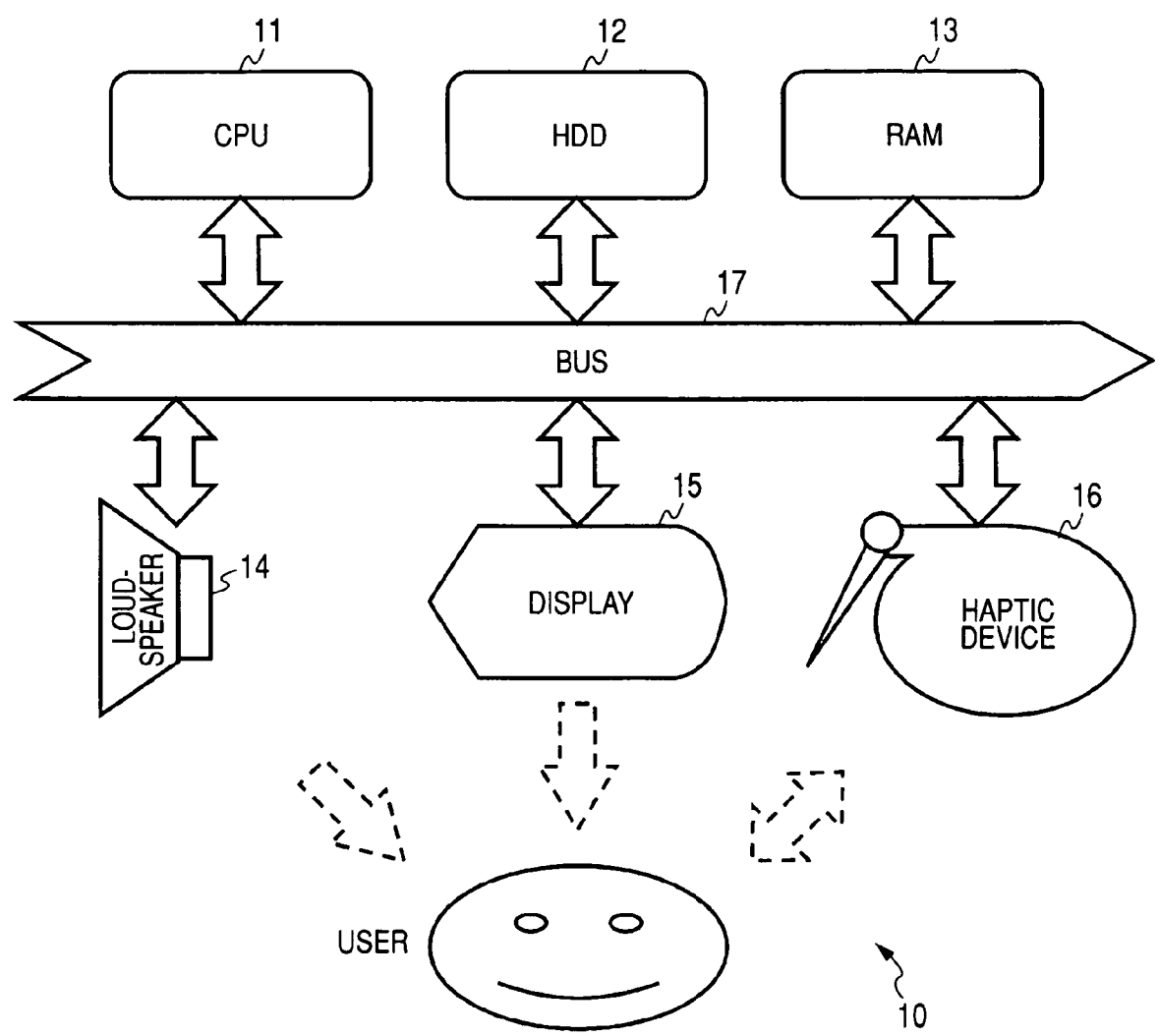
FIG. 3 shows an exemplary system configuration to which a haptic device according to an embodiment of the invention is applied.

FIG. 3 shows an exemplary system configuration to which the haptic device according to an embodiment of the invention is applied. The illustrated system is designed to present the user with what is happening in the three-dimensional space constructed on a computer 10 through input/output devices, such as a loudspeaker 14, a display 15, and a force sensation presentation device (haptic device) 16.

On the computer, a CPU (Central Processing Unit) 11 calculates, in a real-time manner, temporal changes in information, such as sound, image, and force, related to the event that has occurred in the three-dimensional space based on the data recorded on a hard disk drive (HDD) 12. The CPU 11 then allocates the calculation result in a memory (RAM) 13.

Such information on sound, image, and force that has been produced in the three-dimensional space is outputted via the loudspeaker 14, the display 15, and the haptic device 16. By fully using these input/output systems in a synchronous, coordinative manner, the three-dimensional space constructed on the computer is presented to the user with high reality and presence as if the three-dimensional space were a real space.

The devices 11 to 16 are connected to one another via a high-speed bus 17 having a speed fast enough to ensure a real-time capability, so that they can exchange information.

The haptic device 16 is of multi-fingered type and configured in such a way that a device having a position control-type action point presentation unit provided at the tip of each of the serial links capable of presenting three-axis translational forces as shown in FIG. 1 is connected to each of the fingertips of the user. The illustrated system 10 can control such a haptic device having a degree of freedom for position control for presenting the action point in a satisfactory manner. In a virtual environment, although it is expected that events, such as contact and collision between a finger model and a virtual object, discontinuously occur over time, the computer system 10 provides a control method for solving the problem of time delay before the position of the action point having a degree of freedom for position control is presented.

Figure 4:
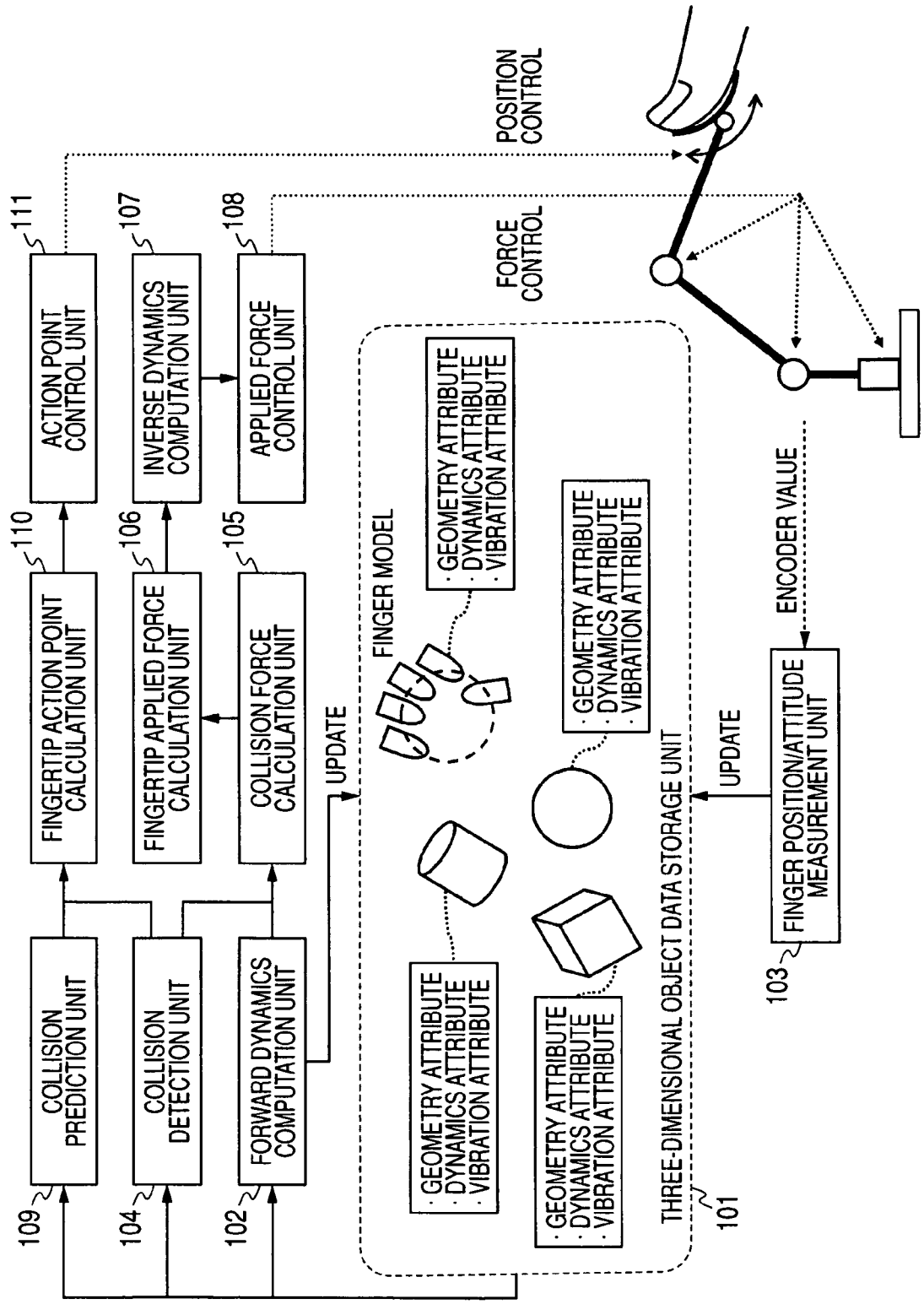
FIG. 4 diagrammatically shows the configuration of a control program executed on a CPU 11.

FIG. 4 diagrammatically shows the configuration of the control program executed on the CPU 11.

The state of the virtual three-dimensional space is defined by attribute information that belongs to each object present in that space, and the attribute information for each object is held in a three-dimensional object data storage unit 101. A real-world example of the three-dimensional object data storage unit 101 is the HDD 12. Examples of the attribute information for each object are data on geometry attributes, such as the position, attitude, dimension, connection, and articulation position, dynamics attributes, such as the mass, inertia tensor, friction, restitution coefficient, force generated at the articulation, and external force, and vibration attributes, such as the attenuation characteristics and normal mode of vibration. Such attribute information is used to calculate temporal changes in information, such as sound, image, and force, related to the event that has occurred in the three-dimensional space. The three-dimensional object data also include finger models for the multiple fingers of the user. The parameters for the finger models as well as the other objects, such as geometry attributes, dynamics attributes, and vibration attributes described above, are stored.

The vibration attributes are used to generate a realistic sound effect based on the result of dynamics simulation when interaction, such as collision and contact, occurs between objects in the three-dimensional virtual space. A method for generating a sound effect is found, for example, in commonly assigned Japanese Patent Application No. 2005-356846. Generation of a sound effect, however, does not directly relate to the spirit of the invention, and hence further description will not be made herein.

The position and attitude of each object in the three-dimensional object data storage unit 101 is changed according to the result of the dynamics computation carried out in a forward dynamics computation unit 102. The forward dynamics computation used herein is computation for deriving acceleration produced on an object based on the force generated within the object and the force acting on the external surface of the object. The acceleration is integrated to simulate the motion of the object based on the Newton-Euler dynamics. The position and attitude of each object reflects the result of the forward dynamics computation, so that each object moves in a realistic manner based on the laws of dynamics.

In the invention, the configuration of the forward dynamics computation unit 102 is not limited to a specific one. For example, the forward dynamics computation FWD disclosed in commonly assigned Japanese Patent Application No. 2005-298090 can also be applied to the invention. The forward dynamics computation may be divided into four processes and carried out in the following order: inertia information calculation→speed information calculation→force information calculation→acceleration information calculation. In this case, acceleration produced at an arbitrary location in an arbitrary direction can be obtained provided that an arbitrary force acts on a link structure, such as a robot.

On the other hand, the object data on the position and attitude of each of the finger models does not reflect the result of the simulation using the forward dynamics computation but the position and attitude of the actual finger obtained in a finger position/attitude measurement unit 103. Each of the joints of each of the serial links that form the haptic device 16 is provided with an encoder that measures the angle of rotation. Based on the output values from these encoders, the finger position/attitude measurement unit 103 solves a well-known forward dynamics computation (computation for determining the position and attitude of a given point on a link structure from articulation values) so as to calculate the position and attitude of the actual finger of the user wearing the haptic device 16.

A collision detection unit 104 detects a collision event between objects in the three-dimensional object data storage unit 101 and calculates a set of collision points. In the invention, the method for detecting collision between objects is not limited to a specific one. For example, a collision detection method using the GJK algorithm (Gilbert-Johnson-Keerthi distance algorithm) can be applied. For the details of this method, see commonly assigned Japanese Patent Application No. 2005-289598, for example.

A collision force calculation unit 105 calculates the external force acting on each of the collision points calculated by the collision detection unit 104 and registers it as the external force information for that object in the three-dimensional object data storage unit 101. The registered external force information is used in the computation in the forward dynamics computation unit 102 and affects the motion of each object. While the method for calculating the collision force is not limited to a specific one in the invention, the calculation method disclosed in commonly assigned Japanese Patent Application No. 2005-298090 can be applied.

A fingertip applied force calculation unit 106 calculates the resultant force of those acting on each of the finger models among the external forces calculated by the collision force calculation unit 105. The fingertip applied force determined in this process is the external force that acts on each of the finger models when they come into contact with another object in the virtual environment, and in the real world, corresponds to the external force that each of the human fingers receives from the surroundings. By presenting this force to the haptic device 16, the sensation that the finger touches a virtual object can be fed back to the user.

An inverse dynamics computation unit 107 calculates the articulation force necessary to exert the force calculated by the fingertip applied force calculation unit 106 on the tip of the haptic device 16 (that is, to provide the external force to be fed back to the fingertip of the user). Now, let f be the fingertip force, and T be the articulation force of the haptic device 16. Then, the articulation force of each of the joints of the serial link can be calculated by using the following equation (1):

$$\tau = J^T f \quad (1)$$

where J denotes Jacobian between the fingertip speed and the articulation speed of the joint.

An applied force control unit 108 controls the force of the motor for each articulation in such a way that each articulation of the haptic device 16 produces the articulation force obtained in the inverse dynamics computation unit 107.

A collision prediction unit 109 predicts, when the finger models and another object approach each other, possible future collision between the finger models and the other object so as to calculate a set of collision points. Based on the predicted collision point information calculated by the collision prediction unit 109, the position where the haptic device 16 presents each action point can be changed in advance even when the finger models abruptly come into contact with the other object. That is, as compared to the case in which the position where the haptic device 16 presents each action point is changed after contact has occurred, the action point can be presented in a satisfactory manner without any time delay even when events, such as collision/contact with the finger models, occur in a discontinuous manner.

Figure 5:
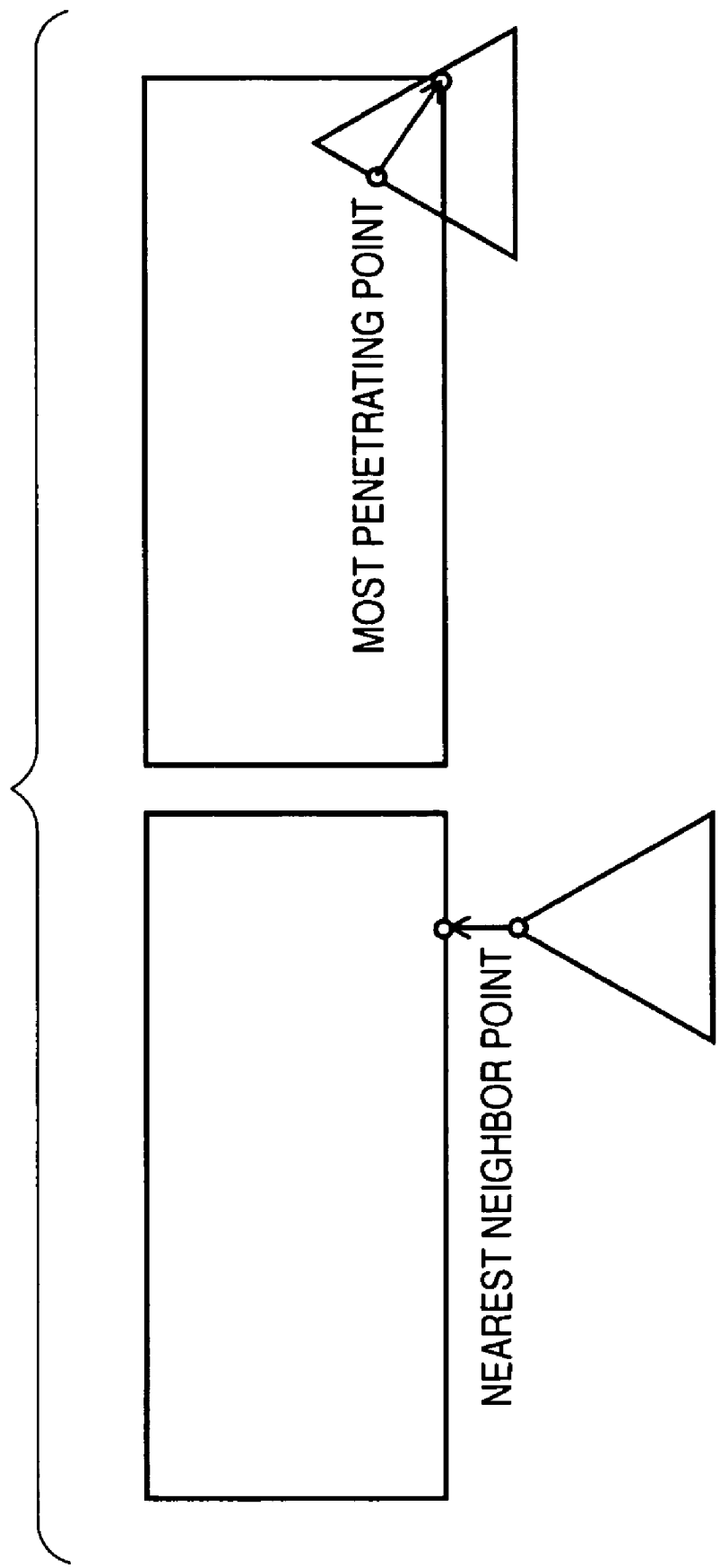
FIG. 5 shows nearest neighbor points and most penetrating points for two three-dimensional objects.

It should be fully appreciated that the primary feature of the invention resides in providing the collision prediction unit 109 in addition to the collision detection unit 104, which is typically provided. The configuration of the collision prediction unit 109 is not limited to a specific one. The following description will be made with reference to a configuration in which the GJK algorithm, which is used in the collision detection, is also used to predict collision. The GJK algorithm is well-known in the art as an iterative method for calculating the distance between convex objects. As shown in FIG. 5, the GJK algorithm can determine nearest neighbor points and most penetrating points for two three-dimensional objects. For the details of the GJK algorithm, see G. van den Bergen, "A Fast and Robust GJK implementation for Collision Detection of Convex Objects" (Journal of Graphics Tools, 4(2), pp. 7-25, 2001), for example.

Figure 6:
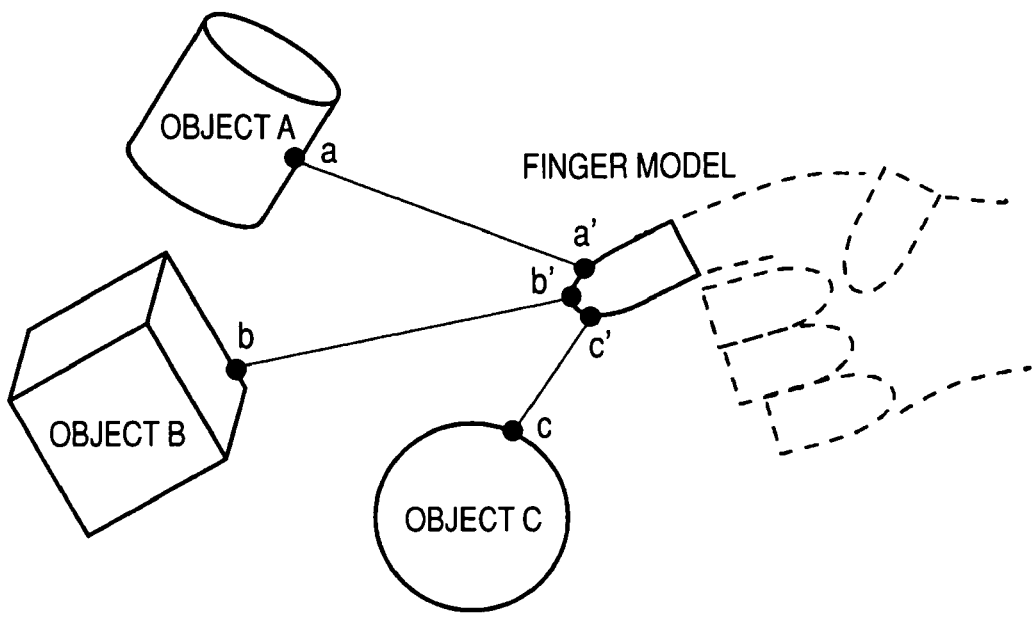
FIG. 6 shows a virtual three-dimensional space in which a finger model and a plurality of objects are present.

Now, assume that three objects, objects A, B, and C, and a finger model are present in a virtual three-dimensional space, as shown in FIG. 6. The collision prediction unit 109 first uses the GJK algorithm to calculate nearest neighbor point pairs (a, a'), (b, b'), and (c, c') between the finger model and all the other objects (objects A, B, and C). Then, the Euclidean distance for each of the nearest neighbor point pairs |aa'|, |bb'|, and |cc'| is evaluated, and the nearest neighbor point pair with the smallest Euclidean distance is determined ((c, c') in the example shown in FIG. 6). The nearest neighbor point pair with the smallest Euclidean distance can be considered as a collision point where the finger model, which currently does not collide with or come into contact with the other objects, most probably does in the future. The point of that nearest neighbor point pair on the finger model side is therefore assigned as a predicted collision point. The collision prediction unit 109 carries out the process described above for each of the finger models attached to the haptic device 16 so as to create a list of predicted collision points for all the finger models.

Figure 7:
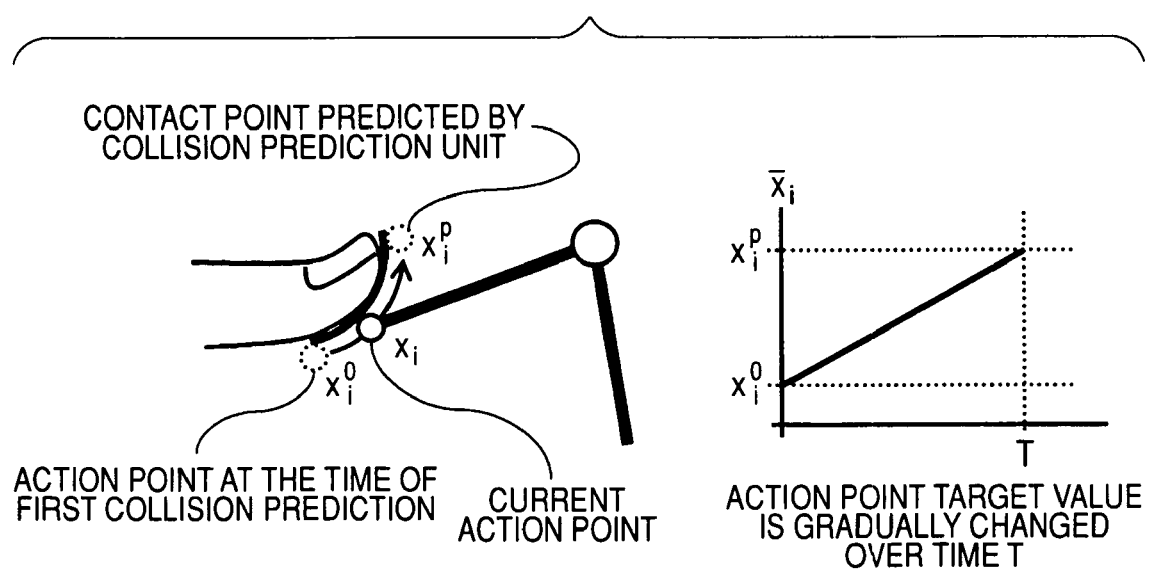
FIG. 7 shows how a fingertip action point calculation unit 110 gradually changes the position of the action point toward a possible future collision point.

A fingertip action point calculation unit 110 uses the information on possible future collision between each of the finger models and the other objects calculated by the collision prediction unit 109 or the information on the currently occurring collision calculated by the collision detection unit 104 so as to determine the position of the action point that the haptic device 16 should present to each of the fingertips. That is, when the finger model is currently in contact with or colliding with the other objects in the virtual space, the collision point calculated by the collision detection unit 104 is assigned as the action point. When the finger model has not come in to contact with or collided with the other objects, the action point is gradually changed toward the possible future collision point calculated by the collision prediction unit 109 (see FIG. 7). For example, when linear interpolation is used, let $x_i$ be the position of the action point that the haptic device 16 currently presents to the fingertip i, and $x^p_i$ be the position of the predicted collision point calculated by the collision prediction unit 109. The target position of the fingertip action point is given by the following equation (2):

$$\bar{x}_i = \frac{(T-t) \times x_i + t \times x^p_i}{T} \quad (2)$$

where T denotes the time starting from the time when collision was predicted for the first time to the time when the action point coincides with the predicted collision point, and t denotes the time that has elapsed since the collision was predicted for the first time. When the collision prediction unit 109 has predicted no collision, the fingertip action point calculation unit 110 does not need to change the action point.

An action point control unit 111 controls the position of the fingertip action point control actuator of the haptic device 16 to achieve the action point target value for each of the fingers calculated by the fingertip action point calculation unit 110.

Figure 8:
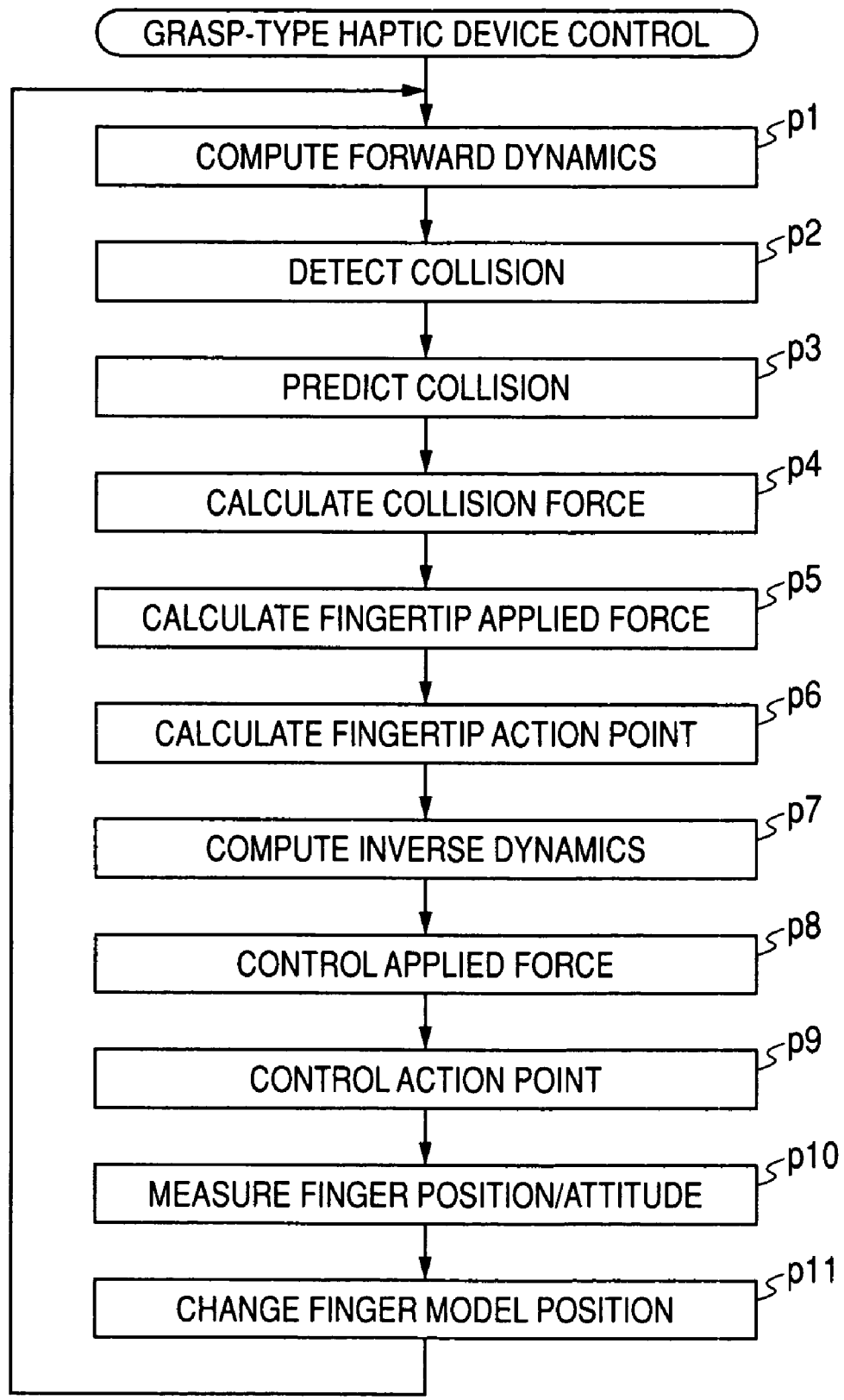
FIG. 8 is a flowchart showing the processing procedure executed by the control program configuration shown in FIG. 4.

FIG. 8 is a flowchart showing the processing procedure executed by the control program configuration shown in FIG. 4.

First, the forward dynamics computation unit 102 carries out dynamics simulation computation for a very short period of time (one microsecond, for example) to update the position and attitude of each of the objects in the three-dimensional object data storage unit 101 (p1).

Then, the collision detection unit 104 detects collision between objects in the three-dimensional object data storage unit 101 and creates a set of collision points (p2). To detect collision, the GJK algorithm (which has been described above) is used, for example.

Next, the collision prediction unit 109 determines possible future collision between each of the finger models and the other objects (p3). As described above, the GJL algorithm is used to determine nearest neighbor point pairs between the finger model and the other objects, and the point pair with the smallest Euclidean distance is determined. The details of the process flow for determining the point pair with the smallest Euclidean distance will be described later.

Then, the collision force calculation unit 105 calculates the external force exerted at the collision point, and the external force is applied to the three-dimensional object data (p4).

Next, the fingertip applied force calculation unit 106 determines the resultant force of the forces acting on each of the finger models (p5) among the external forces calculated by the collision force calculation unit 105 in the above process (p4).

Then, the fingertip action point calculation unit 110 uses the collision information obtained in the process p2 or the predicted collision information obtained in the process p3 to determine the position of the action point to be presented to each of the fingertips by the haptic device 16 (p6). When the finger model is currently in contact with or colliding with one of the other objects, the collision point calculated by the collision detection unit 104 is assigned as the action point. When the finger model has not come into contact with or collided with the other objects, the action point is gradually changed toward the possible future collision point calculated by the collision prediction unit 109. For example, the linear interpolation shown by the above equation (2) is used to gradually change the action point toward the collision point (see FIG. 7).

Next, the inverse dynamics computation shown by the above equation (1) is carried out in the inverse dynamics computation unit 107 to convert the fingertip applied force calculated in the above process p5 into the articulation force necessary to exert the fingertip applied force on the tip of the haptic device 16 (p7).

Then, the applied force control unit 108 controls the force of the motor for each of the joints of the haptic device 16 in such a way that the articulation force calculated in the above process p7 is produced (p8).

Next, the action point control unit 111 controls the position of the fingertip action point control actuator of the haptic device 16 using the fingertip action point calculated in the above process p6 as the target value (p9).

Then, the finger position/attitude measurement unit 103 carries out forward dynamics computation using the value from the encoder attached to each articulation of the haptic device 16 so as to calculate the position and attitude of the actual finger (p10).

Next, the position and attitude of the finger model in the three-dimensional object data storage unit 101 are changed to the position and attitude of the finger obtained in the above process p10 (p11).

The CPU 11 carries out the processing procedure from p1 to p11 every adequately short period of time (control cycle of one microsecond, for example).

Figure 9:
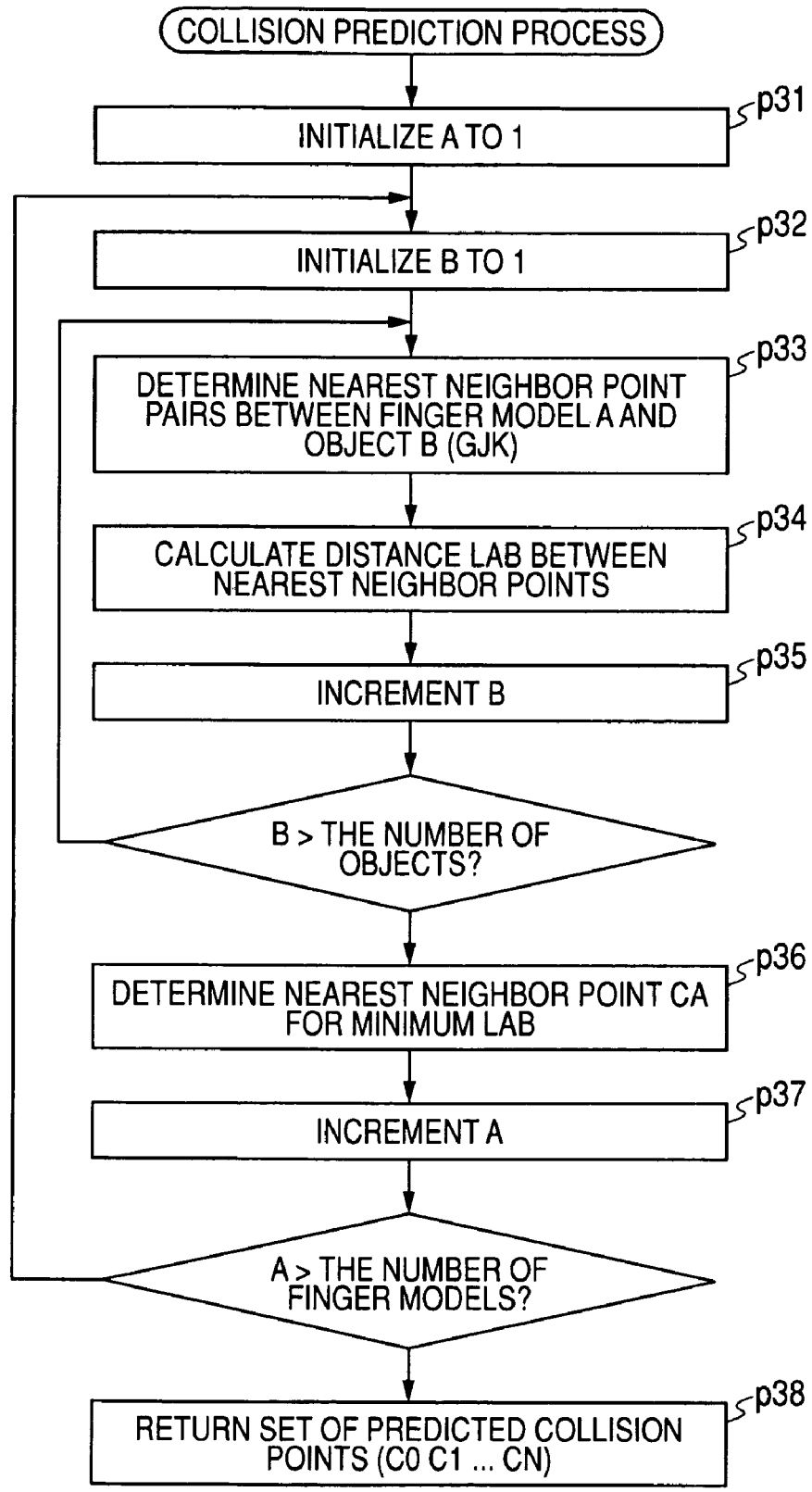
FIG. 9 is a flowchart showing the detailed procedure of a collision prediction process.
Figure 10:
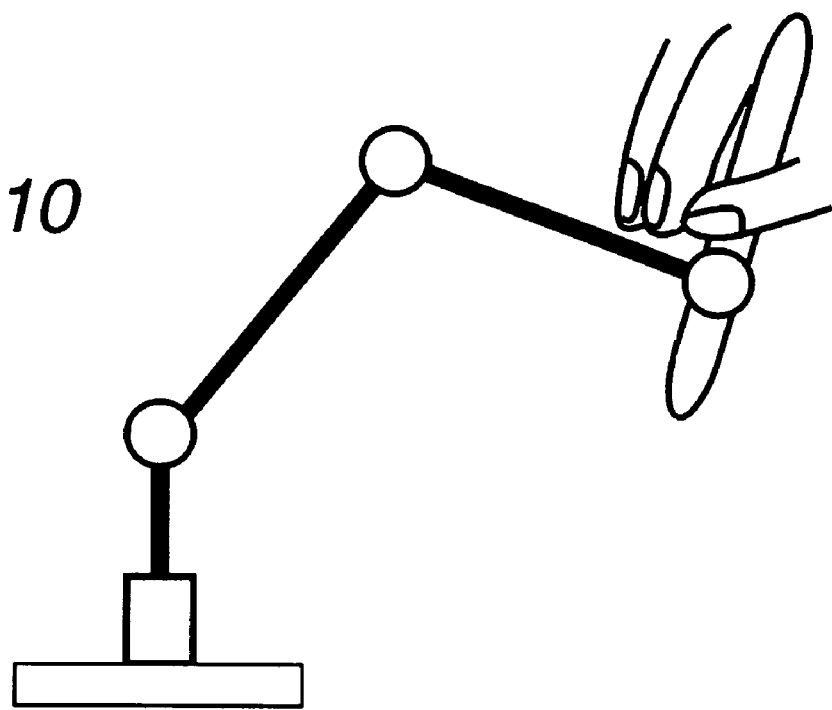
FIG. 10 shows an exemplary configuration of a stylus haptic device using a serial link.
Figure 11:
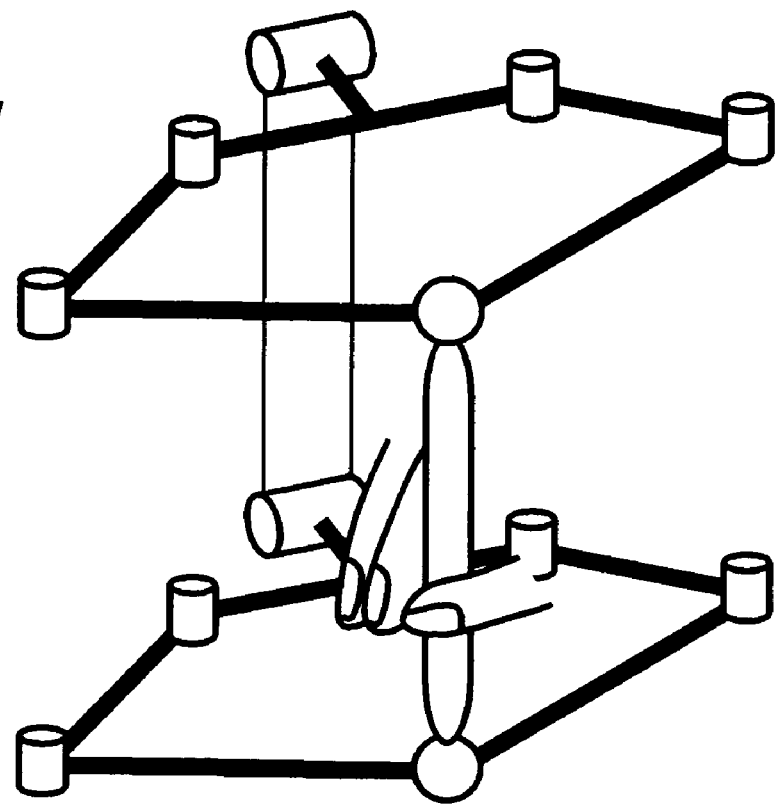
FIG. 11 shows an exemplary configuration of a haptic device using a parallel link structure to present moments of force around three to six axes.
Figure 12:
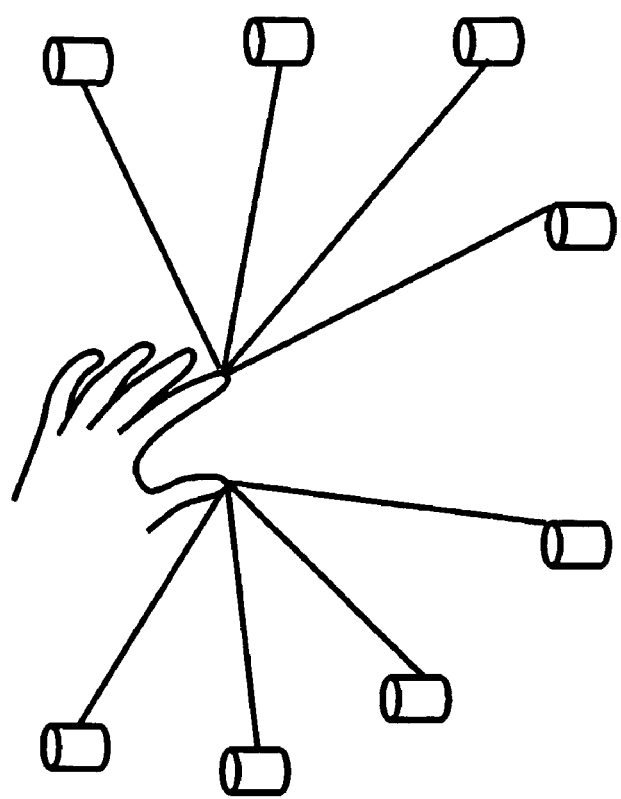
FIG. 12 shows an exemplary configuration of a haptic device in which a finger is connected to remote motors with wires through which forces are applied.
Figure 13:
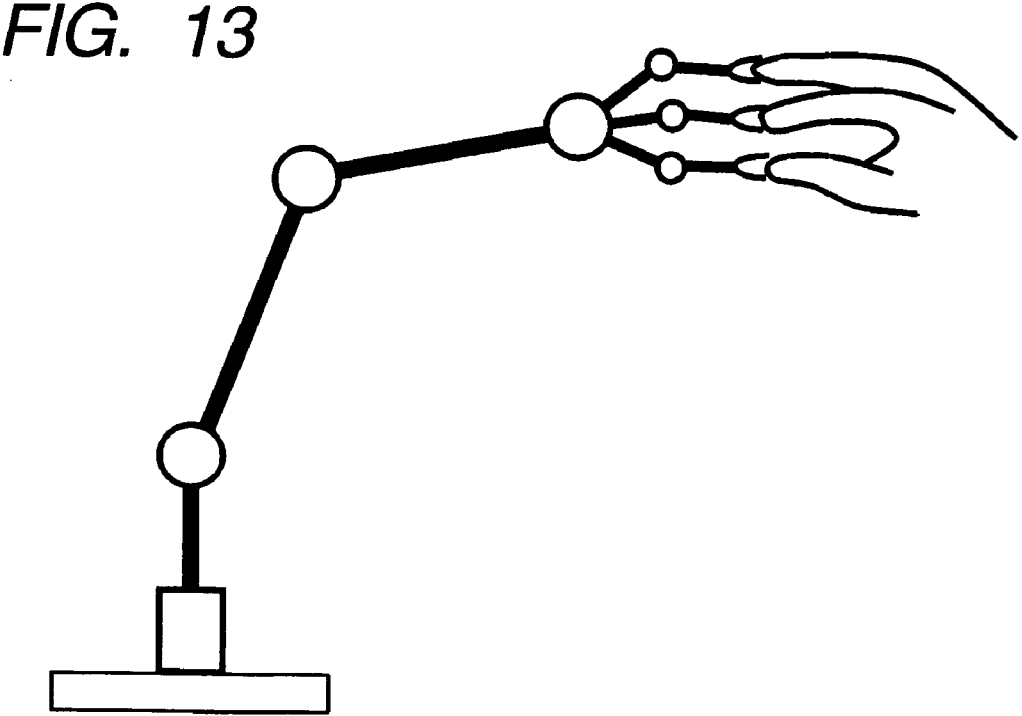
FIG. 13 shows an exemplary configuration of a haptic device in which a hand-type force presentation mechanism is added to a manipulator opposed to a human hand.

FIG. 9 is a flowchart showing the detailed procedure of the collision prediction process executed in the process p3 in the flowchart shown in FIG. 8.

First, the finger model index A is initialized (p31), and the object index B in the virtual three-dimensional space is initialized (p32).

Then, the GJK algorithm is used to calculate nearest neighbor point pairs between the finger model A and the object B ((a, a'), (b, b'), (c, c') and the like in the example shown in FIG. 5) (p33).

Next, the distance LAB between the two points of each of the nearest neighbor point pairs obtained in the above process p33 is calculated (p34).

Then, the object index B is incremented (p35). The set of the processes p33 to p35 is sequentially carried out between a finger model A and all the objects.

Next, among the nearest neighbor point pairs between the finger model A and all the objects B, the nearest neighbor point pair with the smallest nearest neighbor point-to-point distance LAB calculated in the process p34 is found so as to determine the point CA of that nearest neighbor point pair on the finger model side (p36). The point determined in this process corresponds to the most possible point on the finger model A where collision is expected in the future.

Then, the finger model index A is incremented (p37). The processes p32 to p37 are carried out for each of the combinations of all the finger models A and all the objects B.

The list of predicted collision points obtained in the above process p36 for each of the finger models is outputted as a solution to the subsequent collision force calculation process.

As described above, according to the embodiments of the invention, there is provided an excellent haptic device capable of conveying sensation of grasping an object in a satisfactory manner. In a grasp-type haptic device applied to a plurality of fingers, in particular, the position of the contact action point can be suitably presented without an excessively complicated mechanism. That is, by presenting the position of the contact action point under position control to simplify the mechanical structure and predicting collision between a finger and a virtual object to change the position of the action point in advance, grasp sensation can be presented in an accurate, satisfactory manner without time delay in presenting the action point position.

The invention has been described in detail with reference to the specific embodiments. It is apparent, however, that those skilled in the art can modify or replace the above embodiments to the extent that the modification and replacement do not depart from the spirit of the invention.

The force/tactile display according to the above embodiments of the invention can be applied to feedback of three-dimensional force sensation and tactile sensation of an object in an actually inaccessible environment in various applications, including mastering medical and other special skills, and remote manipulation in a virtual environment, such as a microcosm and the ocean, and in a special or hazardous environment, such as an atomic reactor.

Briefly speaking, the invention has been disclosed by way of example with reference to the above embodiments, and hence the contents set forth herein should not be construed in a limited sense. The spirit of the invention should be judged in view of the claims.

It should be understood by those skilled in the art that various modifications, combinations, sub-combinations and alterations may occur depending on design requirements and other factors insofar as they are within the scope of the appended claims or the equivalents thereof.

What is claimed is:

1. A force/tactile presentation device that presents force/tactile sensensation that occurs response to physical interaction with each of a plurality of objects present in a virtual environment, the force/tactile presentation device comprising:
    an action point defined on a mechanical structure, the mechanical structure adjusts its position along a surface provided between a fingernail to a first joint of a fingertip of a user, the surface being in contact with the fingertip between the fingernail to the first joint, the action point presenting the force/tactile sensation to a contact point on the fingertip of the user via the mechanical structure;
    an applied force control means for controlling a force exerted on the action point; and an action point control means for changing a location of the contact point on the fingertip of the user by moving the mechanical structure along the surface between the fingernail and the first joint.

2. The force/tactile presentation device according to claim 1, further comprising a serial link configuration,
    wherein each joint that connects adjacent links is driven by the applied force control means under force control to present a translational force at the action point, and
    a tip of the serial link is driven by the action point control means under position control to present the action point.

3. The force/tactile presentation device according to claim 1, further comprising:
    a collision detection means for detecting collision between objects present in the virtual environment and outputs collision point information;
    a collision prediction means for predicting collision between objects present in the virtual environment and outputs predicted collision point information; and
    an action point determination means for determining the contact point of the action point as a control target value used in the action point control means based on the collision point information obtained by the collision detection means or the collision prediction means.

4. The force/tactile presentation device according to claim 3,
    wherein objects present in the virtual environment include a finger model corresponding to the user's finger that abuts the action point,
    the collision detection means detects collision between the finger model and the other objects, and the collision prediction means predicts collision between the finger model and the other objects,
    the applied force control means controls the force to be presented to the user at the action point, and
    the action point control means controls the contact point of the action point that abuts the user's finger.

5. The force/tactile presentation device according to claim 4,
    wherein the action point determination means determines to use the collision point information calculated by the collision detection means as the control target value used in the action point control means when the collision detection means has determined that there is collision with the finger model-type object, whereas determining to use the collision point information calculated by the collision prediction means as the control target value used in the action point control means when the collision detection means has determined that there is no collision with the finger model-type object.

6. The force/tactile presentation device according to claim 4, further comprising:
    a finger position/attitude measurement means for measuring the position and attitude of the user's finger that abuts the action point; and
    a dynamics computation means for determining the position and attitude of each of the objects other than the finger model in the virtual environment based on dynamics computation,
    wherein the collision detection means detects collision between the finger model and each of the objects based on the position and attitude of the finger model based on the result of the measurement performed by the finger position/attitude measurement means and the position and attitude of each of the objects determined by the dynamics computation means, and
    the collision prediction means predicts collision between the finger model and each of the objects based on the position and attitude of the finger model based on the result of the measurement performed by the finger position/attitude measurement means and the position and attitude of each of the objects determined by the dynamics computation means.

7. The force/tactile presentation device according to claim 6, further comprising:
    a collision force calculation means for calculating the external force acting on the collision point between the finger model and each of the objects detected by the collision detection means; and
    a fingertip applied force calculation means for calculating a fingertip applied force, which is the resultant force of the external forces, calculated by the collision force calculation means, that act on the finger model from each colliding object,
    wherein the applied force control means controls the force exerted on the action point in such a way that the fingertip applied force calculated by the fingertip applied force calculation means is presented to the user' finger that abuts the action point.

8. The force/tactile presentation device according to claim 4,
    wherein the collision prediction means determines nearest neighbor point pairs between the finger model and the other objects and predicts the collision point to be one of the points of the nearest neighbor point pair with the smallest Euclidean distance among the nearest neighbor point pairs.

9. The force/tactile presentation device according to claim 8,
    wherein the collision prediction means uses the GJK algorithm (Gilbert-Johnson-Keerthi distance algorithm) to determine the nearest neighbor point pairs between the finger model and the other objects.

10. The force/tactile presentation device according to claim 1, wherein the force/tactile sensation is presented to the contact point on each fingertip independent of each other.

11. The force/tactile presentation device according to claim 1, wherein the action point control means indicating which portion of each fingertip is in contact with at least one of the objects.

12. The force/tactile presentation device according to claim 11, wherein the portion of each fingertip in contact is on a palm side of the fingertip.

13. A method for controlling a force/tactile presentation device that presents force/tactile sensation that occurs in response to physical interaction with each of a plurality of objects present in a virtual environment, the force/tactile presentation device including
an action point defined on a mechanical structure, the mechanical structure adjusts its position along a surface provided between a fingernail to a first joint of a fingertip of a user, the surface being in contact with the fingertip between the fingernail to the first joint, the action point presenting the force/tactile sensation to a contact point on the fingertip of the user via the mechanical structure,
an applied force control means for controlling a force exerted on the action point, and
an action point control means for changing a location of the contact point on the fingertip of the user by moving the mechanical structure along the surface between the fingernail and the first joint,
the method comprising the steps of:
detecting collision between objects present in the virtual environment and outputting collision point information;
predicting collision between objects present in the virtual environment and outputting predicted collision point information; and
determining the contact point of the action point on the fingertip of the user as a control target value used in the action point control means based on the collision point information obtained in the collision detection step or the collision prediction step.

14. A computer program expressed in a non-transitory computer readable form, the computer program causing a computer to carry out processes for controlling a force/tactile presentation device that presents force/tactile sensation that occurs in response to physical interaction with each of a plurality of objects present in a virtual environment,
the force/tactile presentation device including
an action point defined on a mechanical structure, the mechanical structure adjusts its position along a surface provided between a fingernail to a first joint of a fingertip of a user, the surface being in contact with the fingertip between the fingernail to the first joint, the action point presenting the force/tactile sensation to a contact point on the fingertip of the user via the mechanical structure,
an applied force control means for controlling a force exerted on the action point, and
an action point control means for changing a location of the contact point on the fingertip of the user by moving the mechanical structure along the surface between the fingernail and the first joint,
the computer program causing the computer to carry out:
a collision detection procedure that detects collision between objects present in the virtual environment and outputs collision point information;
a collision prediction procedure that predicts collision between objects present in the virtual environment and outputs predicted collision point information; and
an action point determination procedure that determines the contact point of the action point on the fingertip of the user as a control target value used in the action point control means based on the collision point information obtained in the collision detection procedure or the collision prediction procedure.

15. A force/tactile presentation device that presents force/tactile sensation that occurs in response to physical interaction with each of a plurality of objects present in a virtual environment, the force/tactile presentation device comprising:
an action point defined on a mechanical structure, the mechanical structure adjusts its position along a surface provided between a fingernail to a first joint of a fingertip of a user, the surface being in contact with the fingertip between the fingernail to the first joint, the action point presenting the force/tactile sensation to a contact point on the fingertip of the user via the mechanical structure;
an applied force control unit configured to control a force exerted on the action point; and
an action point control unit configured to change a location of the contact point on the fingertip of the user by moving the mechanical structure along the surface between the fingernail and the first joint.

* * * * *